United States Patent Office 2,900,050
Patented Aug. 18, 1959

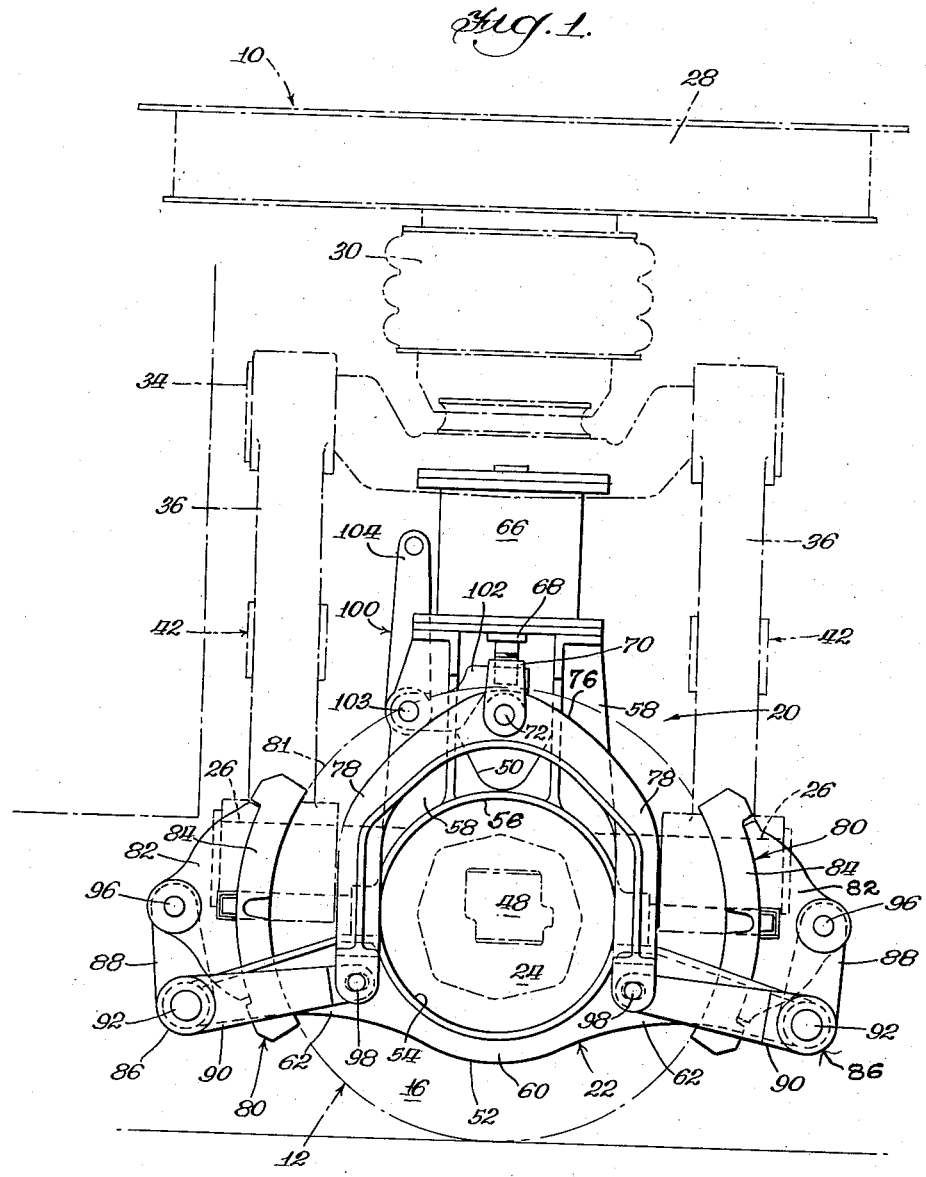

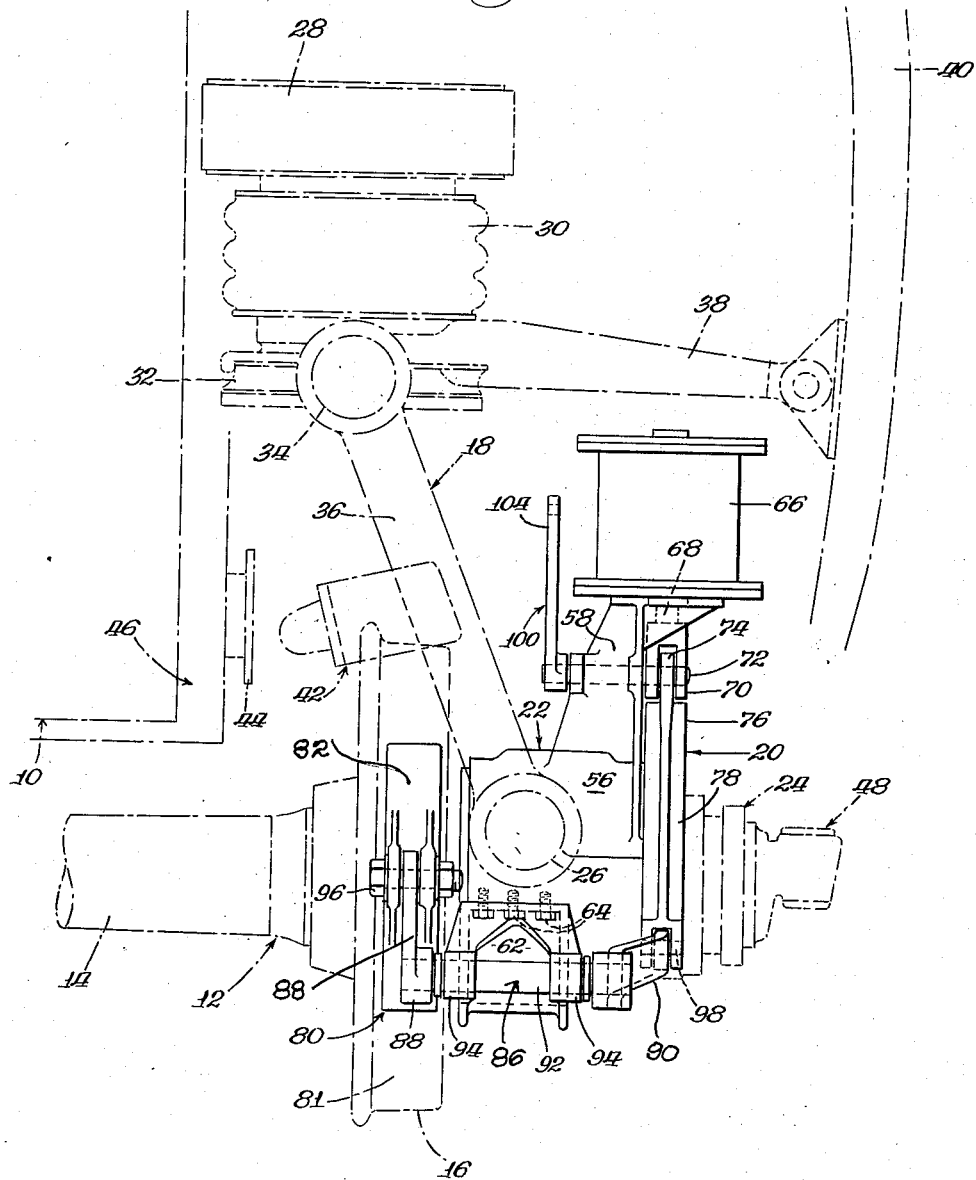

2,900,050

CLASP BRAKE

Arthur F. Baker, Granite City, Ill., assignor to American Steel Foundries, Chicago, Ill., a corporation of New Jersey Application April 20, 1956, Serial No. 579,602

7 Claims. (Cl. 188—56)

This invention relates to brake arrangements and more particularly to a clasp brake arrangement for a railway car.

The invention comprehends a clasp brake linkage arrangement especially suitable for use in a modern, high speed, light weight railway car.

As is well known to those familiar with the art of railway brakes, the radical changes in the design and construction of modern, high speed, light weight, cars have rendered many of the conventional brake rigging arrangements which have been standard equipment on passenger cars for several decades unsuitable.

One reason for this is that because the light weight landing gear type suspension arrangements, in which the car body is supported from the wheel and axle assemblies, afford far less space than do standard trucks, there is not enough space available for conventional brake riggings involving complex lever linkage arrangements.

Thus the reduced weight of the modern cars permits the employment of lighter weight brake rigging which may be facilitated by the use of brake shoes with a high coefficient of friction.

Thus it is a primary object of this invention to provide a clasp brake arrangement of simple design and construction that is particularly adapted for use in light weight, high speed railway cars.

Another object of this invention is the provision of a clasp brake arrangement having a relatively few number of parts and requiring a minimum amount of space.

Another object of the invention is the provision of a compact but efficient clasp brake arrangement suitable for mounting on a single wheel and axle assembly.

Another object of the invention is the provision of a clasp brake arrangement mounted directly on the journal means of a wheel and axle assembly.

A more specific object of the invention is the provision of a clasp brake arrangement having a power cylinder mounted over the journal means and directly connected to a pair of bell crank shaped brake levers fulcrumed to the journal means and pivoted to the brake shoe assemblies.

These and other objects of the invention will be apparent from an examination of the specification and accompanying drawings, wherein:

Figure 1 is a fragmentary side elevational view of a portion of a railway car embodying features of my invention; and Figure 2 is an end elevational view of the structure illustrated in Figure 1.

It will be noted that certain elements have been intentionally omitted from certain views where they are better illustrated in other views.

Referring now to the drawings for a better understanding of the invention, it will be seen that my novel brake arrangement is shown as applied to a modern light weight railway car body indicated generally at 10, which is resiliently supported directly from a wheel and axle assembly 12 comprising an axle 14 and a pair of wheels 16 (only one of which is shown).

The landing gear type of suspension arrangement, indicated generally at 18, may be of various forms and does not form an essential part of my invention. However, I have included in the drawings portions of the suspension arrangement in order that the relative location and application of the brake mechanism, indicated generally at 20, will be more clearly illustrated.

Only one side of the car with its associated suspension arrangement and brake mechanism is illustrated in the drawings as the car is symmetrical about its longitudinal vertical center plane.

As best seen in Figure 2, a brake frame or housing 22, the details of which are hereafter described, is mounted on a conventional antifriction bearing housing or journal box 24, and is provided with a pair of outwardly extending trunnions 26.

The under frame 28 of car body 10 is resiliently supported on pneumatic springs or rubber air bellows 30 seated on a shelf or ledge 32 which is also provided with a pair of outwardly extending trunnions 34. A pair of support arms 36 secured to the respective shelf and brake frame housing trunnions 34 and 26, respectively, serve to support the car body from the wheel and axle assembly. Control of the lateral and vertical motion of the car body with respect to the wheel and axle assembly may be afforded by a tie rod 38 interconnecting the shelf 32 with the outer portion 40 of the car body and by a bumper mechanism 42 mounted on each support arm 36 and engageable with a bumper plate 44 mounted on the inner portion 46 of the car body, and by a snubbing mechanism (not shown) mounted as at 48 on the outer extremity of the journal box 24 and connected in any desired manner to the outer portion 40 of the car body.

As best seen in Figure 1, the brake frame 22 comprises upper and lower elements 50 and 52, which when secured together, present a central cylindrical aperture 54 housing the journal box 24. The upper element or yoke portion 50 of the brake frame 22 comprises a substantially semicylindrical housing 56 seated on the journal box and having, extending substantially vertically upwardly therefrom, a pair of mounting brackets 58 spaced horizontally from each other.

The lower element or strap portion 52 of the brake frame 22 comprises a generally semicylindrical center portion 60 seated against the underside of the journal box and having, extending substantially horizontally outwardly therefrom, a pair of fulcrum arms 62. The yoke 50 and strap 52 of the brake frame may be detachably interconnected on either side of the journal box by means of nut and bolt assemblies 64 (Figure 2). Thus when in completely assembled position, the journal box 24 is snugly and nonrotatably positioned within the cylindrical brake frame aperture 54, as best seen in Figure 1.

To describe in detail the brake mechanism 20, it will be seen that a power cylinder 66 having a piston 68 is mounted on the brake frame mounting brackets 58 with the operating axis of the cylinder in a vertical position and with the piston 68 extending downwardly between the mounting brackets 58. The piston 68 may be provided with a clevis 70 which is secured by pin 72 to a lug 74 formed on a connector element 76. As best seen in Figure 1, the connector 76 is preferably in the form of an inverted U, having downwardly extending legs 78 spaced horizontally from each other and disposed to straddle the brake frame 22.

Deceleration of the wheel 16 is accomplished by a pair of brake shoe assemblies 80 disposed to engage and clasp opposite sides of the wheel tread 81. Each assembly comprises a brake head 82 having a preferably nonmetallic brake shoe 84 detachably mounted thereon for engagement with the tread of the wheel. The brake shoes are connected to the respective legs 78 of the connector 76 by a pair of bell crank shaped brake levers 86 having inboard and outboard arms 88 and 90, respectively, spaced transversely of the truck from each other and interconnected by a center pin or pivot 92 which is non-rotatably pinned or keyed to the respective arms.

The levers 86 are fulcrumed to the respective arms 62 of the brake frame strap 52 with the pivots 92 being received in spaced bearing portions 94 of the respective arms, with the outer extremities of the inboard arms 88 being pivoted by pins 96 to the related brake head 82 and with the outer extremities of the outboard arms 90 being pivotally connected by pins 98 to the adjacent legs 78 of the connector.

Thus it will be seen that in operation as the power cylinder 66 is energized, the piston 68 moves connector 76 downwardly to rotate the left and right brake levers 86 (as seen in Figure 1) clockwise and counterclockwise about pivots 92 whereby the respective brake shoe assemblies 80 are carried into engagement with the wheel tread 81 at opposite sides thereof.

To provide a hand brake attachment, a bell crank shaped lever 100 may be pivoted to one of the mounting brackets 58 adjacent the cylinder 66 with the outboard arm 102 being connected to the piston, as at 104 and with the inboard arm being connected (not shown) to a manually operated hand brake actuating mechanism (not shown) preferably disposed at the end of the car.

I claim:

1. In a brake arrangement for a railway car, a wheel and axle assembly, a journal box mounted on the axle, a brake frame mounted on said journal box, said brake frame comprising a housing surrounding said box and having a fulcrum arm at the lower end of said housing, said arm extending outwardly from one side thereof, a pair of mounting brackets extending upwardly from the upper surface of said housing, said brackets being spaced from each other, a power cylinder mounted on said brackets with its operative axis extending in a vertical plane normal to the rotational axis of the assembly, said power cylinder having a piston, a piston rod extending downwardly therefrom between said brackets, a brake shoe assembly engageable with a wheel tread surface of a related wheel of said wheel and axle assembly, and a substantially bell crank shaped brake lever fulcrumed intermediate its end to the end of said fulcrum arm, said lever having an inboard and an outboard arm spaced from each other inboardly and outboardly of said fulcrum arm, the inboard arm of the lever being pivotally connected to the adjacent brake shoe assembly, and the outboard arm of the lever being operatively connected to the power cylinder, said inboard arm and pivotal connection supporting the related shoe assembly and urging the latter to move towards and away from said wheel.

2. In a clasp brake arrangement for a wheel and axle assembly, a journal box mounted on the axle, a brake frame mounted on the journal box and surrounding the latter, said brake frame having a pair of mounting brackets extending upwardly from an upper portion of said frame, a pair of fulcrum arms extending outwardly from opposite sides of a lower portion of said frame, a power cylinder mounted on the brackets and having a piston rod disposed to extend downwardly towards said box and between said brackets, a substantially U-shaped connector depending from and being connected to said power cylinder piston rod, said connector comprising a pair of downwardly extending legs straddling the brake frame, brake shoe assemblies engageable with the periphery of a related wheel of said wheel and axle assembly, and a pair of bell crank shaped brake levers fulcrumed intermediate their ends to the ends of the respective brake frame fulcrum arms, said brake levers connecting said brake shoe assemblies to the respective connector legs, said brake levers comprising the sole means for carrying said brake shoe assemblies and engaging the latter with the wheel.

3. In a brake arrangement for a wheel and axle assembly, journal means mounted on the axle, a brake frame mounted on the journal means and surrounding the journal means, a power cylinder mounted on the brake frame and disposed above the journal means, said cylinder having a piston rod extending downwardly in a vertical direction with its operational axis being substantially normal to the rotational axis of said assembly, friction means disposed to engage a periphery of a wheel of the assembly, and a bell crank lever fulcrumed to the lower portion of the brake frame, said lever having one end pivoted to the friction means and the other end operatively connected to the piston rod.

4. In a clasp brake arrangement for a wheel and axle assembly, journal means carried by the assembly, a brake frame mountably secured to the journal means outboardly of a wheel of said assembly, said brake frame comprising a yoke disposed above and straddling said journal means and a strap disposed below and rigidly secured to said yoke, a power cylinder secured to the upper surface of said yoke outboardly of said wheel, said cylinder comprising a piston and a rod operative in a downwardly direction along a vertical diametrical axis of said wheel, a U-shaped connector disposed below and pivotally connected to said rod, said connector having a pair of downwardly extending legs straddling said yoke, a pair of offset bell-crank levers, each of said levers comprising a pin pivotally carried by said strap at the ends thereof and an inner and outer arm rigidly secured to said pin inboardly and outboardly of said strap, respectively, and friction means engageable with a wheel tread surface of said wheel, said inner arm pivotally carrying said friction means, said outer arm being pivotally connected to said connector, the pivotal connection on said friction means urging movement of said friction means towards and away from said periphery.

5. In a clasp brake arrangement for a wheel and axle assembly, journal means mounted on the axle of said assembly, a brake frame mounted on the journal means, said brake frame comprising a downwardly extending yoke element seated on and straddling the journal means and a strap element connected to the lower ends of the yoke element to provide a housing for the journal means, a power cylinder comprising a piston and rod, said power cylinder being mounted on the upper surface of the yoke element with its piston rod extending vertically downward in a plane substantially normal to the rotational axis of the assembly, a U-shaped connector connected to the rod, said connector having a pair of downwardly extending legs straddling the yoke element, friction means positioned adjacent and engageable with a periphery of a related wheel of said assembly, and a pair of bell crank levers fulcrumed intermediate their ends to the strap element adjacent the ends of said strap element, each of said bell crank levers comprising an arm pivotally connected to the adjacent friction means and another arm connected to an adjacent leg of said connector element, the pivotal connection between the arm and friction means comprising a common pivotal axis for supporting the friction means and engaging and disengaging the latter from the wheel.

6. In a clasp brake arrangement for a wheel and axle assembly, journal means mounted on the axle of said assembly, a brake frame comprising a yoke element and a strap element secured to each other and disposed to surround said journal means, a power cylinder mounted on the upper surface of said yoke element, a rod operable by said cylinder, friction means disposed to engage a periphery of a wheel of said assembly, a pair of offset levers fulcrumed intermediate their ends to said strap element and disposed on opposite sides of said axle and at the lower ends of said strap element, said levers comprising inner and outer arms spaced inboardly and outboardly of said element, the inner arms being pivotally connected to the respective friction means, and a unitary connector element connecting the power cylinder rod to the outer arms of the levers.

7. In a brake arrangement for a wheel and axle assembly, journal means, a brake frame comprising a yoke and strap member interconnected respectively above and below each other to present a substantially cylindrical aperture therebetween, said frame being mounted on said journal means with the journal means being nonrotatably received within said aperture, power means mounted on the yoke and comprising a cylinder and operating rod, friction means disposed to engage a periphery of a wheel of said assembly, an offset brake lever fulcrumed intermediate its ends to the strap, said lever having one end pivotally connected to the friction means and the other end operatively connected to the operating rod.

References Cited in the file of this patent

UNITED STATES PATENTS

| 432,960 | Welsh | July 22, 1890 |
| 1,084,754 | Perego | Jan. 20, 1914 |
| 1,466,452 | Lipcot et al. | Aug. 28, 1923 |
| 2,250,725 | Ransom | July 29, 1941 |

FOREIGN PATENTS

| 542,343 | France | May 16, 1922 |
| 623,609 | Great Britain | May 19, 1949 |